(12) United States Patent
Tong et al.

(10) Patent No.: US 10,683,457 B2
(45) Date of Patent: Jun. 16, 2020

(54) SOLID COMPOSITE INTUMESCENT STRUCTURES FOR FIRE PROTECTION

(71) Applicant: 3M INNOVATIVE PROPERTIES COMPANY, St. Paul, MN (US)

(72) Inventors: Jiangdong Tong, Ontario (CA); Hui Zhu, Ontario (CA); David E Livingstone, Ontario (CA)

(73) Assignee: 3M Innovative Properties Company, St. Paul, MN (US)

( * ) Notice: Subject to any disclaimer, the term of this patent is extended or adjusted under 35 U.S.C. 154(b) by 589 days.

(21) Appl. No.: 15/033,917

(22) PCT Filed: Oct. 31, 2014

(86) PCT No.: PCT/US2014/063395
§ 371 (c)(1),
(2) Date: May 3, 2016

(87) PCT Pub. No.: WO2015/073228
PCT Pub. Date: May 21, 2015

(65) Prior Publication Data
US 2016/0272891 A1 Sep. 22, 2016

Related U.S. Application Data

(60) Provisional application No. 62/011,672, filed on Jun. 13, 2014, provisional application No. 61/903,130, filed on Nov. 12, 2013.

(51) Int. Cl.
*C09K 21/06* (2006.01)
*C09D 5/18* (2006.01)
(Continued)

(52) U.S. Cl.
CPC .............. *C09K 21/06* (2013.01); *B32B 15/02* (2013.01); *B32B 15/08* (2013.01); *C08J 5/18* (2013.01);
(Continued)

(58) Field of Classification Search
CPC ........ C09K 21/06; C09K 21/14; C09K 21/04; C09K 21/10; C08J 9/0023; C08J 9/0066;
(Continued)

(56) References Cited

U.S. PATENT DOCUMENTS 2,819,759 A * 1/1958 Goodloe ............ A41D 31/0027
160/330
3,090,764 A * 5/1963 Steltz ........................ C08K 3/34
106/16
(Continued)

FOREIGN PATENT DOCUMENTS

CN 101323774 12/2008
CN 101362843 2/2009
(Continued)

OTHER PUBLICATIONS

DuPont Packaging & Industrial Polymers, "Elvax resins Product Data Sheet", Aug. 28, 2014 (3 pages).
(Continued)

*Primary Examiner* — Cephia D Toomer
(74) *Attorney, Agent, or Firm* — Steven A. Bern

(57) ABSTRACT

A free-standing solid composite intumescent structure has at least one bendable metal mesh, preferably at least two, secured on or in a bendable intumescent sheet material. The structure is bendable by a bending force into a shape at a temperature above −10° C. while retaining the bended shape when the bending force is removed. The intumescent sheet material has 10 wt % or more, based on total weight of the sheet material, of a polymeric resin; inorganic filler; and, an
(Continued)

intumescent component. Fire protection barriers can be made from the free-standing solid composite intumescent structure, which can be used in fire protection systems where the fire protection barrier is installed on a substrate, for example steel building elements.

22 Claims, 4 Drawing Sheets

(51) Int. Cl.
| | |
|---|---|
| C09D 7/40 | (2018.01) |
| C09K 21/14 | (2006.01) |
| C08J 9/00 | (2006.01) |
| C08J 9/10 | (2006.01) |
| B32B 15/02 | (2006.01) |
| B32B 15/08 | (2006.01) |
| C08J 5/18 | (2006.01) |
| C09K 21/04 | (2006.01) |
| C09K 21/10 | (2006.01) |
| C08K 7/04 | (2006.01) |

(52) U.S. Cl.
CPC .......... *C08J 9/0023* (2013.01); *C08J 9/0066* (2013.01); *C08J 9/0085* (2013.01); *C08J 9/0095* (2013.01); *C08J 9/108* (2013.01); *C09D 5/185* (2013.01); *C09D 7/70* (2018.01); *C09K 21/04* (2013.01); *C09K 21/10* (2013.01); *C09K 21/14* (2013.01); *B32B 2305/38* (2013.01); *B32B 2307/3065* (2013.01); *C08J 2323/08* (2013.01); *C08J 2331/04* (2013.01); *C08K 7/04* (2013.01)

(58) Field of Classification Search
CPC ........ C08J 9/0085; C08J 9/0095; C08J 9/108; C08J 5/18; C08J 2323/08; C08J 2331/04; B32B 15/02; B32B 15/08; B32B 2305/38; B32B 2307/3065; C08K 7/04; C09D 5/185; C09D 7/70
See application file for complete search history.

(56) References Cited

U.S. PATENT DOCUMENTS

| | | | |
|---|---|---|---|
| 4,144,385 A * | 3/1979 | Downing | C08G 63/52 521/95 |
| 4,221,835 A | 9/1980 | Severus-Laubenfeld | |
| 4,292,358 A | 9/1981 | Fryer | |
| 4,404,297 A | 9/1983 | Fishler | |
| 4,493,945 A | 1/1985 | Feldman | |
| 4,521,493 A | 6/1985 | Class | |
| 5,404,687 A | 4/1995 | Blake | |
| 5,580,648 A | 12/1996 | Castle | |
| 6,031,040 A | 2/2000 | Horacek | |
| 6,043,304 A | 3/2000 | Kehal | |
| 6,153,674 A | 11/2000 | Landin | |
| 6,747,074 B1 | 6/2004 | Buckingham | |
| 6,809,129 B2 | 10/2004 | Abu-Isa | |
| 7,217,753 B2 | 5/2007 | Sinclair | |
| 2003/0139492 A1 | 7/2003 | Abu-Isa | |
| 2008/0176994 A1 | 7/2008 | Allermann | |
| 2008/0224105 A1 | 9/2008 | Green | |
| 2009/0255619 A1 | 10/2009 | Tong | |
| 2012/0174508 A1 | 7/2012 | Brooks | |
| 2013/0255893 A1 | 10/2013 | Stobich | |

FOREIGN PATENT DOCUMENTS

| | | |
|---|---|---|
| CN | 102731931 | 10/2012 |
| DE | 19705736 | 10/1998 |
| EP | 1207183 | 5/2002 |
| EP | 1498463 | 1/2005 |
| FR | 2946259 | 12/2010 |
| GB | 1455251 | 11/1976 |
| JP | 2002-322374 | 11/2002 |
| JP | 2011-025130 | 2/2011 |
| JP | 2012-019001 | 1/2012 |
| WO | WO 2000-058419 | 10/2000 |
| WO | WO 2002-070622 | 9/2002 |
| WO | WO 2002-096996 | 12/2002 |
| WO | WO 2004-076176 | 9/2004 |
| WO | WO 2009-099755 | 8/2009 |
| WO | WO 2010-030685 | 3/2010 |
| WO | WO 2015-073229 | 5/2015 |

OTHER PUBLICATIONS

International Search Report for PCT International Application No. PCT/US2014/063395, dated Feb. 19, 2015, 3 pages.

* cited by examiner

SOLID COMPOSITE INTUMESCENT STRUCTURES FOR FIRE PROTECTION

CROSS REFERENCE TO RELATED APPLICATIONS

This application is a national stage filing under 35 U.S.C. 371 of PCT/US2014/063395, filed Oct. 31, 2014, which claims the benefit of U.S. Provisional Application No. 61/903,130, filed Nov. 12, 2013, and 62/011,672, filed Jun. 13, 2014, the disclosure of which are incorporated by reference in its/their entirety herein.

This application claims the benefit of U.S. Provisional Patent Application Ser. No. 61/903,130 filed Nov. 12, 2013 and U.S. Provisional Patent Application Ser. No. 62/011,672 filed Jun. 13, 2014, the entire contents of both of which are herein incorporated by reference.

This application relates to intumescent materials, particularly for fire protection.

BACKGROUND

Fire proofing is a passive fire protection measure that refers to the act of making materials or structures more resistant to fire, or to those materials themselves, or the act of applying such materials. Applying a certification listed fire proofing system to certain structures allows them to have a fire-resistance rating. In case of a fire, the fire proofing materials must keep their integrity for the purpose of protection.

An important part of modern building design is the protection of structural steel such as columns, beams, girders and other steel assemblies from the damaging effects of fire. Steel does not burn, but can lose strength at high temperatures. As a result, a variety of fire protection systems, namely mineral insulants, cementitious sprays and intumescent coatings, have been developed to insulate steel from the effects of fire in order to prolong the time required for steel to reach a temperature of about 538° C., generally by one to two hours, depending upon local fire regulations.

Intumescent materials, commonly intumescent coatings, are used for fire proofing structural steels. A major advantage of coating is the ability to cover somewhat sophisticated substrates with relative ease. Intumescent coatings are coatings that react under the influence of heat and swell to 10-100 times their original thickness, producing an insulating char that protects the substrate to which the coating is applied from the effects of fire. Because intumescent coatings are needed at a relatively low thickness, as compared with the thickness required for other types of insulating materials to achieve a similar fire protection rating, they are increasingly becoming the preferred choice for structural fire protection. Another attractive feature of intumescent coatings is their smooth and aesthetically pleasing finish. Thin film intumescent coatings therefore allow architects and designers to maximize the creative design possibilities of structural steel.

Typical intumescent coatings usually comprise a minimum of four components: a source of mineral acid catalyst, typically ammonium polyphosphate; a source of carbon, typically pentaerythritol or dipentaerythritol; a blowing agent, typically melamine; and a binder, typically a thermoplastic resin. When an intumescent coating is subjected to heat, a series of reactions occur. The ammonium polyphosphate decomposes to produce polyphosphoric acid, catalyzing the dehydration of pentaerythritol to produce char. The blowing agent also starts to decompose, giving off non-flammable gases that cause the carbon char to foam, thus producing a meringue-like structure that is highly effective in insulating the substrate from heat. The basic function of the binder is to bind together the components of the intumescent coating, so that they may be applied to the substrate and held in intimate contact therewith until required to perform their function in a fire situation. Furthermore, the binder contributes to the formation of a uniform cellular foam structure, since the molten binder helps trap the gases given off by the decomposing blowing agents, thus ensuring a controlled expansion of the char. Binder content must be controlled at certain level. Insufficient binder will result in coating defects such as cracking or delamination, whereas too much organic binder will weaken the char strength and cause higher flame spread rate.

Intumescent coatings are generally categorized into three types: water-based (W/B), solvent-based (S/B), and epoxy-based (E/B). Water-based and solvent-based intumescent coatings are among the most widely used products (over 80% usage in the North American market). These coatings utilize a thermoplastic binder, such as polyvinyl chloride (PVC), polyurethane, polyester, polyvinyl acetate, phenolic resin, acrylic resin, and copolymers of ethylene vinyl acetate, or styrene acrylics. The thermoplastic characteristics of the binder allow the coating to swell significantly (with blowing agent) and form chars 10-100 times the original coating thickness. Therefore, only a relatively thin film is required with water-based or solvent-based coatings. However, significant drawbacks of these types of coatings exist in application and handling In application, depending on the coating thickness required for fire proofing, a steel member may require 2 to 10 layer of coats. Since only a limited thickness (usually 40-50 mils or 1.0-1 2 mm per day) can be sprayed in a single application without sagging or peeling, and the coating must be allowed to dry (greatly affected by environmental conditions, such as humidity and temperature) before a second layer can be applied, a project may take up weeks or months to finish. Additionally, a trained applicator must apply the coating to ensure that a uniform thickness is applied. For solvent-based systems, the applicator must be aware of special safety considerations, for example inhalation hazards and flammability. Finally, sprayed on coatings are messy and necessitate extensive cleanup of the job site following installation.

In shipping and handling, water-based intumescent coatings quality deteriorates when subjected to freezing or hot temperatures (above 35° C.) conditions. Due to the instability of certain ingredient in water, water-based intumescent coatings usually have shelf lives of about 6 months.

Epoxy-based coatings (e.g. PPG's Pitt-Char® and Akzo Nobel's Chartek® systems) have great durability and are mostly used for outdoor applications, such as offshore platforms or industrial plants. Because of the thermosetting nature of epoxy resins, epoxy-based coatings swell poorly upon heating (only a few times their original thickness) and consequently require greater amounts to be applied in order to attain the desired fire protection rating. The cost of epoxy systems is usually much higher than water-based and solvent-based systems, meaning that the overall project cost is prohibitive for interior applications. In addition, the aesthetic finish is compromised due to the much greater coating thickness required.

Coatings are often reinforced using, for example, short length pieces of glass fibers or mineral fibers mixed with the coating during application. The random direction of the fibers mixed throughout the coating lends reinforcement, reducing the likelihood of sagging, and allowing greater overall coating thickness to be applied to increase fire protection ratings beyond what can be achieved without reinforcement. These fibers are also well known to enhance char strength during fire. However, incorporating long fibrous materials in intumescent coating is prohibitive due to spraying difficulties and aesthetic concerns.

100% solid intumescent fire proofing materials are described extensively in the literature. US 2008/02241005 A1 describes a liquid curable intumescent system by radical polymerization. US 2012/0174508 A1 describes curable intumescent system using a silane-terminated polyurethane or a silane terminated polyether as binder. U.S. Pat. No. 7,217,753 B2 describes a powder coating system using phenolic resin capable of protecting steel substrate for 2 hours. All these systems are thermosetting, potentially requiring sophisticated installation equipment.

Ammonium polyphosphate, melamine, and polyalcohol are well described in literature as non-halogenated fire retarding compound for thermoplastic materials. U.S. Pat. No. 6,043,304 describes a flame-retarded hot-melt adhesive composition, which may be applicable to dimensionally heat-recoverable articles to flow and seal when the articles are heat-recovered in use. U.S. Pat. No. 6,809,129 B2 describes a moldable elastomeric intumescent material comprising chlorinated polyethylene, plasticizer, phosphate based foaming agents, char forming materials, antioxidants, intumescent materials, flame retardant materials, and graphite and/or expandable graphite. JP 2002/322374 describes a moldable intumescent sheet composition for fire protection, which is typically flexible or non-rigid, having an organic binder content typically above 30 wt % of total dry composition and an expansion ratio of up to about 10.

Commonly owned co-pending United States Patent application 61/903,130 filed Nov. 12, 2013 by Tong et al. describes hot melt intumescent materials (HMI) with preferably <20 wt % resin, typically less than 17 wt %, bendable at elevated temperature (90° C.). It also demonstrates that HMI can be reinforced by single layer of metal mesh. U.S. Pat. No. 4,292,358 by Fryer et al. described an intumescent barrier made by applying intumescent coatings over a support medium such as metal mesh. U.S. Pat. No. 4,493,945 described a mesh supported active thermal protective system, in which bending was only possible by scoring the materials at edges. The open edges were then refilled with active thermal protective materials. U.S. Pat. No. 5,404,687 by Blake et al. described an unbendable fire proofing panel where screws must be used to secure structure edges where panels were jointed. WO 02/070622 by Feldman et al. described a flexible thermal protective system using flexible intumescent epoxy coating and embedded mesh.

There remains a need in the art for improved intumescent materials for fire proofing, which may overcome one or more of the problems associated with current fire resistant materials, for example: time associated with the application of the required thickness of conventional coatings; extended drying time associated with conventional coatings (mostly W/B and S/B); limited installation conditions; damaged coating difficult to repair; short shelf life for water-based coating; necessity for jobsite installation; large thickness associated with E/B; expensive equipment required for installation; and extensive cleaning of job site.

SUMMARY

There is provided a free-standing solid composite intumescent structure comprising at least one bendable metal mesh secured on or in a bendable intumescent sheet material, the structure bendable by a bending force into a shape at a temperature above −10° C. while retaining the bended shape when the bending force is removed, the intumescent sheet material comprising: 10 wt % or more, based on total weight of the sheet material, of a polymeric resin; inorganic filler; and, an intumescent component.

There is further provided a fire protection barrier comprising the free-standing solid composite intumescent structure.

There is further provided a fire protection system comprising the fire protection barrier installed on a substrate.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
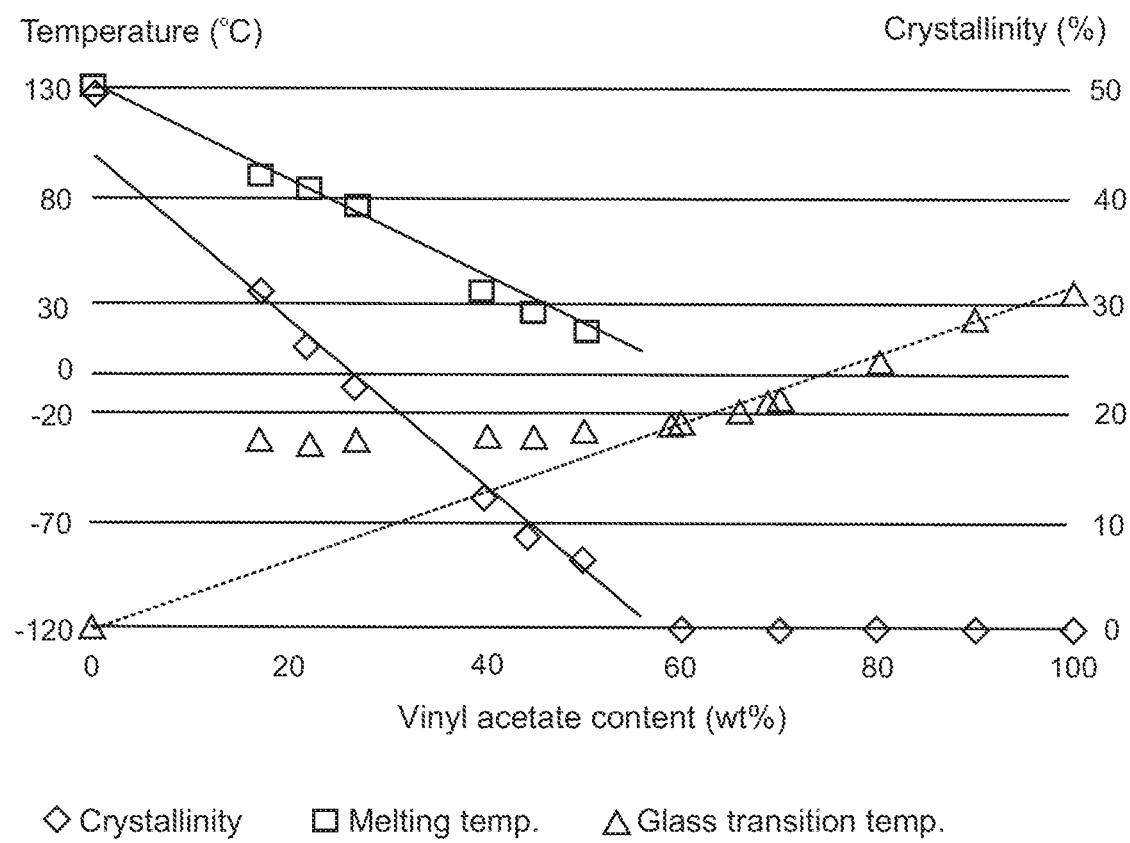
FIG. 1 is a graph cited from public information showing the effect of vinyl acetate content (VA) in ethylene-vinyl acetate (EVA) copolymers on melting temperature, glass transition temperature and crystallinity.

Ambient temperature bendable solid composite intumescent structures are disclosed that require minimal skill and effort to install as fire proofing materials and combine the benefits of different types of fire proofing materials, for example the efficiency and aesthetics of intumescent coatings, the simplicity of drywall, and the shape-ability of wraps, while still being relatively low-cost.

The free-standing solid composite intumescent structure does not require a substrate to maintain structural integrity. The free-standing solid intumescent structure is bendable at a temperature above −10° C. while retaining the bended shape when the bending force is removed. Preferably, the temperature at which the structure is bendable while retaining the bended shape is in a range of −10° C. to 150° C., more preferably −10° C. to 40° C. Such structures may require the application of no or little heat to make them sufficiently bendable to shape into a desired shape, while at the same time the intumescent structures retain the shapes into which they are bent, i.e. they do no return to their original shapes and there is little or no shape-loss after bending. This greatly simplifies the use of the intumescent structure in various applications because the structure may be utilized on a job site or fashioned into pre-made shapes prior to transport to the job site, without requiring equipment for heating the intumescent structures prior to bending them into the desired shapes. In addition, the intumescent structures could be applied to objects, for example building materials like steel beams, prior to transporting the objects to the job site. Thus pre-fabrication of steel building elements, for example, with fire proofing material is possible. Further, the temperature at which the intumescent structure is shaped is considerably less than the activation temperature (e.g. about 200-250° C.) of the intumescent component of the intumescent sheet material so that the intumescent structure may be safely shaped without activating intumescence. Since the temperature at which the intumescent structure is shaped may be very low, loss of physical properties of the intumescent sheet material (e.g. flexibility) is minimized or eliminated.

Shaping the intumescent structure involves forming the intumescent structure into any desired configuration by, for example, bending, pressing, twisting and other alterations. The configuration of the intumescent structure is thus made without breaking or unduly cracking the intumescent structure, especially without breaking or unduly cracking the intumescent sheet material in the intumescent structure. The intumescent structure may be produced by embedding the bendable metal mesh into a sheet or film of the bendable intumescent sheet material, or securing the metal mesh to a surface of the sheet of film. Where more than one metal mesh is used, the intumescent sheet material may be disposed between two of the metal meshes. To accomplish embedding the metal mesh, the intumescent sheet material may be heated to soften the sheet material sufficiently so that the metal mesh may be pressed into the sheet material. The sheet material may then be cooled, and form a sandwich-like structure when at least two metal meshes are used. No spraying or coating is required. Preferably, mesh openings where the mesh is in contact with the sheet material are fully occluded by the sheet material, although not all of the mesh openings need to be fully occluded. The mesh may extend beyond the edges of the sheet material, or the sheet material may extend beyond the edges of the mesh, or the edges of the sheet material and the mesh may meet. The intumescent structure may have sufficient flexibility that bends or fold of up to 180° may be achieved without causing undue defects. The bendable metal mesh combined with the bendable intumescent sheet material provides a balance between rigidity and flexibility so that the intumescent structure can be bent at low temperature to form a shape but still retain the bent shape after bending. The metal mesh helps protect the intumescent sheet material from cracking during bending. In one embodiment, the bendable metal mesh provides rigidity for shape retention where a flexible intumescent sheet material would normally return to its original shape or at least lose a bent shape after being bent. It is particularly advantageous to use at least two metal meshes for multiple reasons. For example, there is a reduced chance of detachment between the intumescent sheet material and the mesh, the composite intumescent structure has improved mechanical properties, the composite intumescent structure may have improved surface finish due to the ability to use finer mesh, and more importantly the intumescent sheet material between two meshes is unlikely to split during a fire.

The polymeric resin and resulting intumescent sheet material preferably have physical properties that result in a solid intumescent sheet material being bendable at a temperature above −10° C. Physical properties that result in the intumescent sheet material being bendable at a temperature above −10° C. may be one or more of crystallinity index of the resin, glass transition temperature ($T_g$) of the resin, melting temperature ($T_m$) of the resin, storage modulus (G') of the intumescent material, and elongation at break of the intumescent material. Where crystallinity of the resin is important, the resin is preferably semi-crystalline or amorphous. Semi-crystalline resins preferably have a crystallinity index above 0% but less than or equal to about 20%, more preferably about 10% or less. Amorphous resins have a crystallinity index of about 0%. Where $T_g$ is important, the $T_g$ is lower than the bending temperature, preferably at least about 25° C. lower than the temperature of bending Where resin $T_m$ is important, the $T_m$ is preferably lower than the temperature of bending unless the crystallinity index is lower than 10%. Where storage modulus (G') is important, the storage modulus of the intumescent materials is preferably in a range of $10^6$-$10^9$ Pa at the temperature of bending. Where the elongation at break is important, the elongation at break is preferably larger than 15% at the temperature of bending.

Provided the resin and/or the resulting intumescent sheet material have such physical properties, any suitable polymer type may form the basis for the resin, for example thermoplastics, elastomers or thermosets. The resin may comprise one or more polymers. The one or more polymers may be homopolymeric, copolymeric (including block copolymeric), terpolymeric or any blend thereof. The resin may comprise urethane, silicone, acrylic, epoxy or other type of curable resin. The resin preferably comprises thermoplastic elastomer. Some suitable polymer types include vinyl acetate-based polymers, acrylate-based polymers and styrenic polymers. Ethylene-vinyl acetate copolymers and styrene acrylic copolymers are preferred. Ethylene-vinyl acetate copolymers are particularly preferred. In particular, ethylene-vinyl acetate (EVA) copolymers having high vinyl acetate content are preferred. FIG. 1 is a graph showing the effect of vinyl acetate (VA) content in ethylene-vinyl acetate copolymers on melting temperature, glass transition temperature and crystallinity. The graph is from the Levamelt™ brochure from Lanxess Inc. From FIG. 1 it is apparent that when VA content is about 55 wt % or lower, the copolymer behaves as a semi-crystalline copolymer, but when the VA content is about 55-90 wt %, the copolymer acts more like an amorphous rubber. Vinyl acetate content of the EVA is preferably about 20 wt % or greater based on total weight of the copolymer, more preferably about 40 wt % or greater, yet more preferably about 41 wt % or greater. Vinyl acetate content of the EVA is preferably about 90 wt % or less based on total weight of the copolymer. The vinyl acetate content of the EVA is preferably in a range of about 20-90 wt %, or about 41-90 wt %, or about 42-80 wt %, or about 42-70 wt %, based on total weight of the copolymer. Particularly preferred resins comprise Levamelt™ and/or Levapren™ (both from Lanxess Inc.), which are ethylene-vinyl acetate copolymers having high vinyl acetate content, very low crystallinity and a very low glass transition temperature.

The resin is present in the intumescent material in an amount of about 10 wt % or more, based on total weight of the sheet material, preferably about 15 wt % or more, more preferably about 15-30 wt %, yet more preferably about 15-25 wt %, even more preferably about 17-25 wt %, even yet more preferably about 20-25 wt %. Total weight of the sheet material is the weight of the sheet material without the at least one metal mesh. The resin functions as a binder for other components of the intumescent sheet material. Too much resin may lead to too much smoking and flaming when the intumescent material is activated. Not enough resin may render the material unshapeable. Furthermore, the resin content of the intumescent sheet material may be important to balance the ability of the intumescent sheet material to hold the metal meshes and to permit the sheet material to exude through the openings in the meshes when the material is intumescing.

The inorganic filler may comprise any suitable inorganic filler for fire protection applications. Inorganic fillers include, for example, metal oxides (e.g. titanium dioxide, silicon dioxide), metal carbonates (e.g. calcium carbonate), metal or mixed metal silicates (e.g. clays, talc, mica, kaolin) and mixtures thereof. The inorganic filler may be present in the material in any suitable amount, for example about 5-25 wt %, or about 10-20 wt %, based on the total weight of the sheet material. Total weight of the sheet material is the weight of the sheet material without the at least one metal mesh.

The intumescent component is responsible for the majority of the intumescent properties of the sheet material. The intumescent component may comprise one or more of a charring catalyst (i.e. acid donor), charring agent (i.e. carbonific char former) and blowing agent (i.e. spumific). Preferably, at least the charring catalyst and charring agent are utilized in the intumescent component. Any suitable charring catalyst or mixture thereof may be employed. The charring catalyst is an acid donor and may comprise, for example, phosphate-based or non-phosphate-based catalysts. One or more phosphate-based charring catalysts are preferred, for example ammonium polyphosphate, alkyl phosphates, haloalkyl phosphates, melamine phosphate, products of reaction of urea or guanidyl urea with phosphoric acids or product of reaction of ammonia with $P_2O_5$. The charring catalyst is preferably present in the material in an amount of about 25-55 wt %, more preferably about 30-50 wt % or about 35-45 wt %, based on total weight of the sheet material. Total weight of the sheet material is the weight of the sheet material without the at least one metal mesh. Any suitable charring agent or mixture thereof may be employed, for example polyhydric alcohols (e.g. starch, dextrin, pentaerythritol (monomer, dimer, trimer, polymer), phenol-formaldehyde resins or methylol melamine). Pentaerythritol and di-pentaerythritol are preferred. The charring agent is preferably present in the material in an amount of about 5-20 wt %, more preferably about 8-15 wt %, based on total weight of the sheet material. Total weight of the sheet material is the weight of the sheet material without the at least one metal mesh. When a blowing agent is used, any suitable blowing agent or mixture thereof may be employed, for example amines or amides (e.g. urea, urea-formaldehyde resins, dicyandiamide, melamine or polyamides). Melamine is preferred. The blowing agent is preferably present in the material in an amount of about 5-20 wt %, more preferably about 8-15 wt %, based on total weight of the sheet material. Total weight of the sheet material is the weight of the sheet material without the at least one metal mesh.

Plasticizer may be useful in the hot melt intumescent materials. Adding plasticizer reduces the hot melt viscosity and increasing the ease of product manufacturing. Liquid plasticizers may also lower the glass transition temperature of the resin, thus allowing the intumescent sheet to be bendable at sub-freezing temperatures. Adding too much plasticizer may lower the intumescent sheet material's physical properties, such as modulus, tensile strength, and hardness, to undesirable level. Certain plasticizers may have a $T_g$ (or $T_m$) higher than that of the resin, which may ease processing but may prevent the intumescent material from being bendable at ambient temperature. Suitable plasticizers include, for example, dibutyl sebacate, dioctyl sebacate, dioctyl adipate, dibutyl adipate, blends of diethyl glycol benzoate, dipropylene glycol dibenzoate, trioctyl trimellitate, adepic polyester and alkyl sulphonate of phenol. Some alkyl phosphate based liquid flame retardants can also be used as plasticizers, for example tricresyl phosphate, tri(2-ethyl hexyl phosphate) and 2-ethyl hexyl diphenylphostate. The amount of plasticizer used is preferably about 10 wt % or less, more preferably about 5 wt % or less, based on the total weight of the sheet material. Total weight of the sheet material is the weight of the sheet material without the at least one metal mesh. The combined amount of resin and plasticizer in the intumescent sheet material is preferably about 15-40 wt %, more preferably 15-30 wt %, and most preferably 15-25 wt %, based on the weight of the sheet material. Total weight of the sheet material is the weight of the sheet material without the at least one metal mesh.

Other additives known in the art may be utilized in the intumescent sheet material. Some examples include colorants, oxidation stabilizers, UV stabilizers, reinforcing fibers, density reducing fillers (e.g. glass bubbles), processing aids (e.g. releasing agents), etc. Other additives are each typically present in the intumescent sheet material in the amount of about 0.1-10 wt %, based on weight of the sheet material. Total weight of the sheet material is the weight of the sheet material without the at least one metal mesh. In addition, decorative and/or protective coatings may be applied to the intumescent sheet material.

Inclusion of a dispersed reinforcing material in the intumescent sheet material is of particular note. The dispersed reinforcing material may comprise organic and/or inorganic materials, preferably one or more inorganic materials. Inorganic materials include, for example, silicon dioxide (e.g. glass, quartz), silicates (e.g. sodium silicate, calcium silicate, natural mineral, synthetic mineral), inorganic carbon (e.g. carbon nanotubes), metal (e.g. steel, aluminum) or mixtures thereof. Inorganic fibers, especially mineral fibers (e.g. glass fibers, rock fibers, synthetic mineral fibers, carbon fibers), are preferred.

The intumescent sheet material reacts under the influence of heat to swell to many times its original thickness, producing an insulating char that protects a substrate to which the intumescent sheet material is applied from the effects of fire. The ratio of swollen thickness to original thickness is called the expansion ratio. The intumescent sheet material of the present invention beneficially has an expansion ratio of about 10 or greater, preferably about 15 or greater. The expansion ratio is preferably in a range of about 10-60, or about 15-60, or about 10-40. The expansion ratio is preferably about 15-35. Further, the intumescent sheet material may beneficially protect the substrate from fire for at least about 30 minutes, preferably at least about 2 hours, in accordance with standard methods of fire endurance tests of building construction (CAN/ULC S101, ASTM 119) or with hydrocarbon fire test methods (UL 1709). Fire protection can last for about 3 hours or more. Preferably, fire protection lasts for about 0.5-4 hours, more preferably about 2-4 hours. Fire protection time of solid composite intumescent structures are generally significantly longer than fire protection time of an intumescent sheet material without metal mesh.

It is particularly noteworthy that the intumescent material of the present invention may be formed by compounding without the use of a solvent (e.g. water or organic solvent), and sometimes without heat. Dry compounding is a solvent-free process that permits direct fabrication of a solid intumescent material eliminating the need for drying the material after formulation, and eliminating the need for additional water-based or organic solvent-based additives. In some cases, though, to facilitate compounding it may be useful to include one or more processing aids in the mixture. Such processing aids may evaporate during compounding so that they do not remain in the intumescent material. Processing aids include, for example solvents (e.g. water or organic solvent) and plasticizers (e.g. alcohol esters). Processing aids are preferably utilized in an amount of about 10 wt % or less, more preferably about 6 wt % or less, based on total weight of the mixture. Where processing aids do not evaporate during processing, the amount of resin and processing aids together in the sheet material is preferably in a range of about 15-40 wt %, more preferably 15-30 wt %, and most preferably 15-25 wt %, based on the weight of the sheet material. Total weight of the sheet material is the weight of the sheet material without the at least one metal mesh.

Compounding may be accomplished in any suitable compounding equipment by any suitable method. Compounding may be performed in one or a combination of mixing and laminating devices including vertical mixers, horizontal mixers and extruders (e.g. Haake mixer, Sigma blade, Kneader, and single or twin screw extruders). The compounding may be done in batches or continuously. Compounding may be performed at a temperature of about 190° C. or less, preferably about 170° C. or less, more preferably about 150° C. or less, and in some cases without heating with an external heat source. The temperature is sufficiently less than the activation temperature (about 200-250° C.) of the intumescent component that the intumescent material may be safely compounded without activating intumescence.

The intumescent material formed by compounding is generally viscous but pliable and may be subsequently processed into a sheet. Processing may be accomplished by any suitable method with a mold of suitable design. In many cases, it may be useful to mold the intumescent material into films of desired thickness, for example by hot pressing. One advantage of the present intumescent material and process is the ability to provide films of any desired thickness without the need to build up layers of material with intervening delays for drying as in water-based or organic solvent-based spray technologies.

Films of the intumescent material may have any thickness at the outset. A particular benefit is the ability to produce very thin films providing excellent fire resistance. For example, thin films may have a thickness of up to about 25 mm, or up to about 12 mm (e g about 1-25 mm or about 1-12 mm), which is competitive to many commercially producible intumescent coatings. Films may be cast into sheets of virtually any size. The sheets may be sandwiched between two bendable metal meshes by embedding the meshes into top and bottom surfaces of the sheet, which may be accomplished by heating the sheet to soften the sheet sufficiently to permit pressing of the meshes into the sheet to form the free-standing solid composite intumescent structure. Securing (e.g. gluing) one or more of the meshes to a surface of the sheet may be done instead of or in addition to embedding the mesh in the sheet.

The free-standing solid composite intumescent structure comprises at least one bendable mesh, preferably at least two bendable metal meshes whereby two of the metal meshes have the intumescent sheet material disposed there between. The free-standing solid composite intumescent structure preferably comprises two bendable metal meshes. More than two metal meshes may be present in some embodiments. In general, a solid composite intumescent structure with at least two metal meshes, for example a sandwich structure, can maintain a desired angle (shape) after being bent more easily than a solid composite intumescent structure with only one metal mesh. However, when conditions are met, it is possible to bend a solid composite intumescent structure with only one metal mesh into a desired bended shape with the structure retaining the bended shape, for example when a stronger mesh and low G' intumescent material are used.

The bendable metal meshes are bendable at a temperature above −10° C. The meshes may provide rigidity and shape memory to the intumescent structure, especially when the intumescent sheet material is so flexible or elastic that the material cannot maintain its shape after being bent. It is generally desired that, while bending, the memory force of the intumescent sheet materials to return to the original shape is less than the capacity of the metal meshes to retain the desired bent shape without significant deformation. For example, bending a 12 mm thick intumescent sheet may require a stronger mesh (larger diameter or smaller mesh size) compared to bending a 2 mm sheet. Further, commercial metal mesh is usually presented in a roll and non-flat form. When forming a composite intumescent structure, for example by pressing metal mesh and intumescent sheet material together, a flat composite intumescent form can be achieved. It is generally desired that the memory force of the metal mesh to return to its originally presented non-flat shape is less than the capacity of the intumescent sheet material to retain the flat shape. For example, for the same type and thickness of intumescent sheet material, it is easier to maintain the composite intumescent structure in a flat form when using thin wire metal mesh as opposed to thick wire metal mesh. However, on bending the solid composite intumescent structure during a fireproofing process, the metal meshes should still be strong enough to maintain the composite intumescent structure in the bended shape. A balance between the memory forces of the metal mesh and the intumescent sheet material is desired.

Materials suitable for metal meshes include, for example, steels (iron), e.g. plain steel, galvanized steel, coated steel or stainless steel, and other generally strong but bendable materials with high melting points, such as nickel, copper, aluminum or suitable alloys. The metal mesh preferably comprises a steel mesh. Meshes comprising materials such as fiberglass, plastics or carbon, for example, are generally unsuitable because these materials lack one or more of flexibility, shape retention and heat resistance, especially at wire thicknesses suitable for meshes in the present intumescent structures.

Meshes may be constructed of a crisscrossing array of metal strands, for example metal wires. Mesh size refers to the size of opening between the strands, e.g. the average distance between neighboring strands. Strand width refers to the diameter of each strand in the plane of the mesh. Mesh thickness refers to the thickness of the entire mesh, which relates to the thickness of the strands in a direction perpendicular to the plane of the mesh. A balance of mesh size, strand width and mesh thickness may be important to provide sufficient support and rigidity for the intumescent sheet material while allowing the intumescent material to go through the openings when the material intumesces.

Mesh size and openings are important. If mesh openings are too small, intumescent materials may not be allowed to expand through the mesh during a fire, thus not providing the desired insulating function. Suitable mesh opening may also be used to control (e.g. depress) the expansion ratio and enhance the char density or strength, enabling longevity of the char during a fire. Mesh size is preferably about 1.5 mm or greater, or about 1.6 mm (1/16") or greater, or about 3.2 mm (⅛") or greater. Maximum mesh size is about 25.4 mm (1"), preferably 12.8 mm (½") or smaller, most preferably 6.4 mm (¼") or smaller. Strand width is preferably about 1 mm or less, more preferably about 0.8 mm or less. Mesh opening is preferably a minimum of 1.5 mm or higher, preferably 3.1 mm or higher. Relative weight of the metal meshes to the sheet material is preferably in a range of about 1% to 100%.

The metal meshes may be flat or dimpled, preferably flat. The metal meshes may be woven but not welded, welded but not woven, or woven and welded. The use of welded meshes (woven or non-woven) may provide non-optimal results. Non-optimal results generally refer to a diminution in fireproofing performance or the aesthetic appeal of the composite intumescent structure. When using intumescent sheet materials having high storage modulus, the use of welded meshes may result in broken mesh and/or cracked intumescent material. When using intumescent sheet materials having low storage modulus, the use of welded meshes may result in the intumescent material squeezing through the mesh generating rough surfaces such as alligator skins. Further, it is also more difficult to use welded mesh for bending the composite intumescent structure into a round shape with uniform radius, especially when the diameter of the shape is small. Therefore, the metal meshes are preferably not welded. Bending composite intumescent structures with woven but not welded mesh usually generates uniform and smooth shapes on the outward (convex) surface, for example the outer surface of a rectangular tube or a round pipe. Mesh breaking or materials cracking are generally not observed. Therefore, the metal meshes are preferably woven, more preferably woven and not welded.

When at least two metal meshes are employed, the metal meshes may have the same characteristics or one or more different characteristics. Preferably the metal meshes have the same characteristics, but if the meshes are different, the mesh on the inside of bends to be made in the intumescent structure preferably is stronger than the mesh on the outside of the bend. For example, when bending a mesh supported sheet of intumescent material, the mesh on the inner side of the bend is often buckled, which is a potential issue for aesthetics if the inner side needs to be exposed (e.g. in an I-beam shape). Providing a stronger mesh on the "bend to" side may improve the finish. Provided there is at least one mesh having appropriately sized openings, a solid thin metal sheet could be used instead of another mesh when two or more meshes are desired.

Generally, the intumescent structure is pre-shaped into required specification prior to installation over a substrate, e.g. steel columns or beams. The shaping process may be carried out at the construction jobsite or at a converting facility, at ambient or elevated temperature. The intumescent sheet structure can be shaped following the contour of the substrate, e.g. rectangular, round, wide flange (I-beam) or angle steels. Alternatively, the intumescent structure can be shaped into rectangular or triangular boxes for easy installation.

Shaping planar intumescent structures into above-mentioned non-planar shapes can be carried out by typical sheet metal bending equipment and methods, e.g. bending brakes, die sets, roll bending, etc. Bending composite intumescent structures with conventional equipment, e.g. a bending break may generate buckles in the inward (concave) side. This can become an aesthetic issue if the concave side is exposed, e.g. the corner of a wide flange of steel. Such buckles may be removed or reduced by secondary mechanical processes, such as pressing the buckled surfaces to a hard surface or by selecting a stronger mesh on the compressed side. For ease of installation, intumescent structures may be generally shaped into half of the required shape, for example, to enclose a round column two half pipe structure are pre-bended. In another example, the intumescent structure may be bent to form a shell that can be slid over the substrate.

Pre-shaped intumescent structures may be installed at construction job site, or pre-installed at a separate facility, e.g. a fireproofing contractor's shop or a steel manufacturer's plant, then stored (if necessary) and transported to the job site.

Installation of the free-standing solid composite intumescent structure on a substrate to be fire proofed may be accomplished in any suitable manner, for example with the use of an adhesive, a mechanical fastener or both. Mechanical fasteners include, for example, bolts, clamps, staples, screws, pins, grips, tack strips and magnets. In the case of staples or similar fastening structures, it is advantageous that the intumescent structure comprises metal meshes because the meshes provide an anchor for the fastener. Therefore, the use of adhesives is not required to install the intumescent structure on a substrate. This also permits leaving an air gap between the intumescent structure and the substrate, which can be advantageous in some applications because the intumescent sheet material may activate earlier without fully contacting the steel substrate, which acts as heat sink. Magnets are generally only useful for coating the intumescent structure on ferrous substrates, for example steel, and are most useful for temporarily holding the intumescent structure on the substrate while the intumescent structure is being fastened with other mechanical fasteners. Adhesives may be applied as a tape or a liquid to one or both of the substrate or solid intumescent structure and then the solid intumescent structure mounted on the substrate. The adhesive may comprise, for example, a curable liquid epoxy or urethane that may be sprayed or painted on a surface, a contact adhesive comprising two components one of which is sprayed on the substrate and the other of which is sprayed on the solid intumescent structure, or a pressure sensitive adhesive tape that may be laminated on to the solid intumescent material as a backing layer and optionally provided with a release liner covering at least a portion of the adhesive backing layer that may be peeled away when the intumescent structure is positioned. A liquid adhesive (e.g. an epoxy or urethane resin) is preferred because the liquid fills grooves and other irregularities and permits re-positioning the intumescent structure on the surface to correctly position the sheet before the adhesive sets. Adhesives may be used to permanently bond the intumescent structure to the substrate or to temporarily hold the intumescent structure while mechanically fastening the structure to the substrate.

Substrates with installed solid composite intumescent structure are usually presented with seams. Seams are typically placed where one edge of a composite intumescent structure meets either another edge of the same composite intumescent structure or an edge of another composite intumescent structure. Seams may be held substantially closed to minimize separation of the edges to ensure full coverage of the substrate by the intumescent structures. Seams may be held substantially closed in any suitable manner, for example with the use of an adhesive, a mechanical fastener or both. Mechanical fasteners are preferred and include, for example, staples, tack strips and the like. Tack strips are particularly useful because tack strips make it possible to secure the strip on one side of a seam and then pull the intumescent structure tight around the substrate before securing the tack strip on the other side of the seam. In this way, the solid composite intumescent structure can be installed on the substrate with a tight friction fit without damaging the substrate with mechanical fasteners or adhesives.

The seams, when small enough, do not necessarily need to be repaired for fireproofing performance purpose, because the intumescent material swells to fill the gap during a fire. When needed, seams can be repaired by using ambient temperature applicable sealants (for example a room temperature vulcanizing caulking, an intumescent putty, etc.) or elevated temperature applicable hot melts (for example materials from commonly owned co-pending U.S. Patent application 61/903,130). The sealants or hot melts are preferably intumescent, but not necessarily if used for aesthetic purpose.

Suitable coatings or films can be applied on top of solid composite intumescent structure to provide decorative or protective functions.

The solid composite intumescent structure is designed to permit installation onto a substrate in a single layer, an advantage over current technology such as multiple spraying, wrapping, etc.

The solid composite intumescent structure may be installed on surface prepared or non-prepared, an advantage over intumescent coatings.

The solid composite intumescent structure may be weather resistant and suitable for exterior exposure and application, an advantage over water-based intumescent coatings. Water-based intumescent coatings weather poorly and lose their intumescent ability over time as they are exposed to humidity, cold and/or heat. In contrast, the present solid composite intumescent structures may weather well, losing relatively little intumescent ability when exposed to extreme conditions of humidity, cold and heat.

Figure 2:
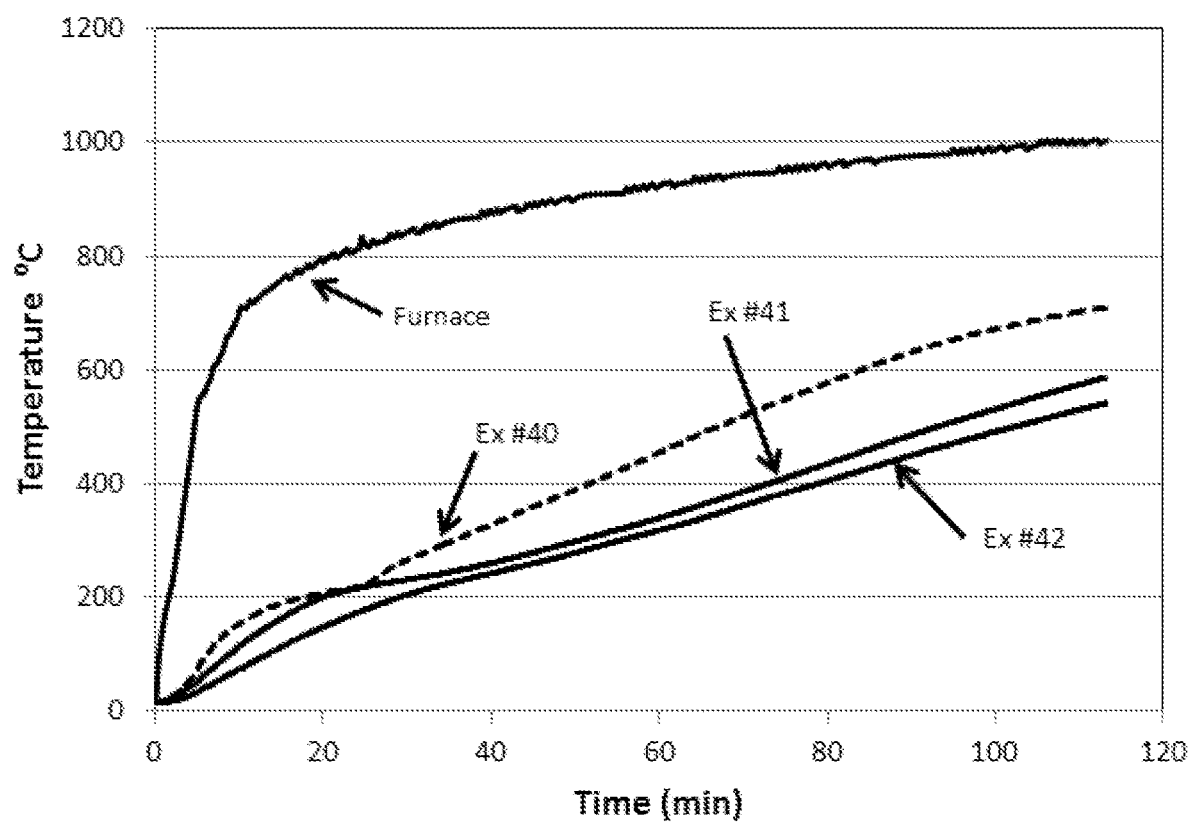
FIG. 2 depicts a graph showing results of an ASTM 119 plate test.

The solid composite intumescent structure performs advantageously when comparing fireproofing time at similar thicknesses on the same steel substrate to commercially available leading intumescent coating products. Further, the intumescent structure performs advantageously over an intumescent sheet made of the same intumescent material but lacking the metal meshes. As seen in FIG. 2, Ex #40 is a sample of an intumescent sheet material without metal meshes, while Ex #41 is a sample of the same intumescent sheet material with one mesh on the side toward the fire and Ex #42 is a sample of the same intumescent sheet material sandwiched between two metal meshes to form a solid composite intumescent structure. It is clear from FIG. 2 that Ex #41 and #42 provide significantly longer fire protection than Ex #40.

The free-standing solid composite intumescent structure is useful as fire protection barriers in buildings or other structures. Some non-limiting examples include the fire proofing of structural steel, electrical cable trays, walls, floors, ceilings, doors, cabinets, bulkheads of ships, transport containers, compartments of vehicles. The intumescent structure is especially useful for structural steel, for example columns, beams, girders and other steel assemblies in buildings.

Figure 3A:
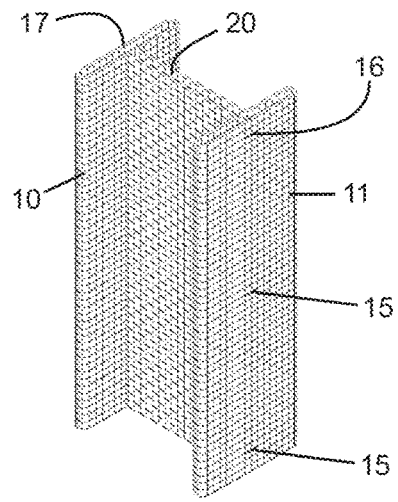
FIG. 3A depicts a metal I-beam fireproofed by two solid composite intumescent structures.
Figure 3B:
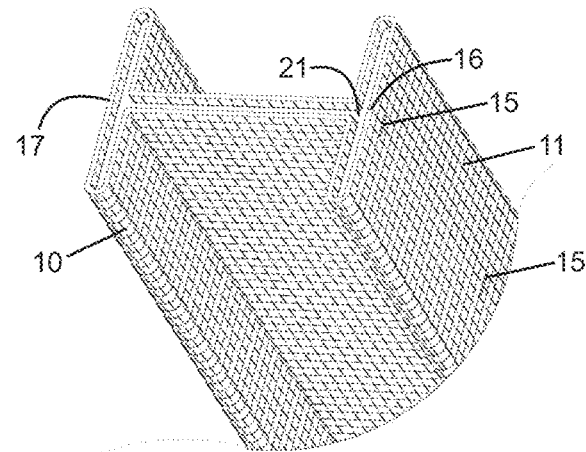
FIG. 3B depicts a magnified view of one end of the fireproofed I-beam of FIG. 3A
Figure 3C:
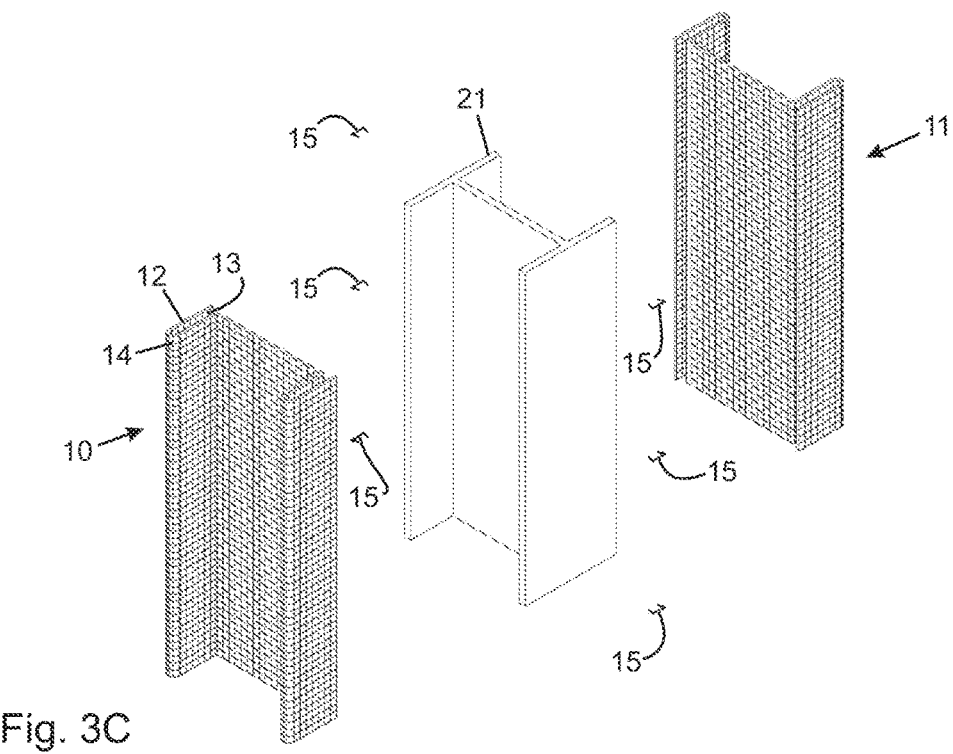
FIG. 3C depicts an exploded view of FIG. 3A.

In a particular example, with reference to FIG. 3A, FIG. 3B and FIG. 3C, a steel I-beam 21 may be fireproofed by two solid composite intumescent structures 10,11 of the present invention. The two intumescent structures 10,11 are bent at room temperature around the I-beam 21. FIG. 3A shows how the two intumescent structures are connected together to form a cavity 20 in which the I-beam 21 is disposed. Each of the intumescent structures 10,11 has two 90° bends and two 180° bends. Seams 16,17 are formed where the edges of the two intumescent structures 10,11 meet. While two seams 16,17 are shown along the middle of each edge of the I-beam 21, there could be any number of seams in any location depending on the number and shapes of the solid composite intumescent structures used. Mechanical fasteners, e.g. staples 15, may be used to secure the intumescent structures 10,11 together at the seams 16,17 where the edges of the intumescent structures 10,11 meet. Each intumescent structure comprises a sheet of intumescent material sandwiched between two metal meshes. For example as shown in FIG. 3C, the intumescent structure 10 has a sheet of intumescent material 12 sandwiched between two metal meshes 13,14 embedded into each side of the sheet of intumescent material 12 such that intumescent material protrudes through the openings in the meshes thereby occluding the openings in the meshes.

Figure 4A:
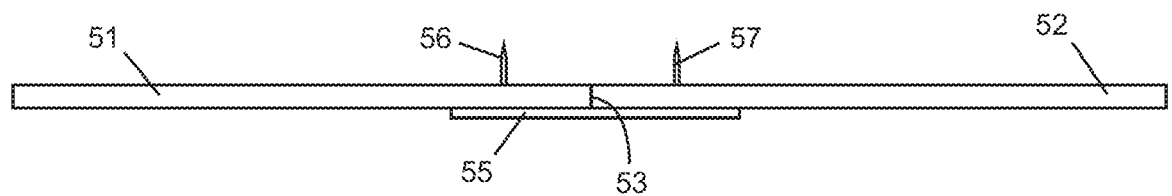
FIG. 4A depicts a side view of two panels of solid composite intumescent structures being connected at a seam by tack strips.
Figure 4B:
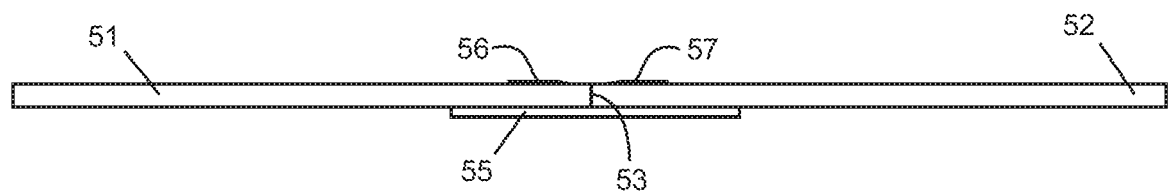
FIG. 4B depicts FIG. 4A with tacks of the tack strips bent over to help secure the panels to the tack strips.
Figure 4C:
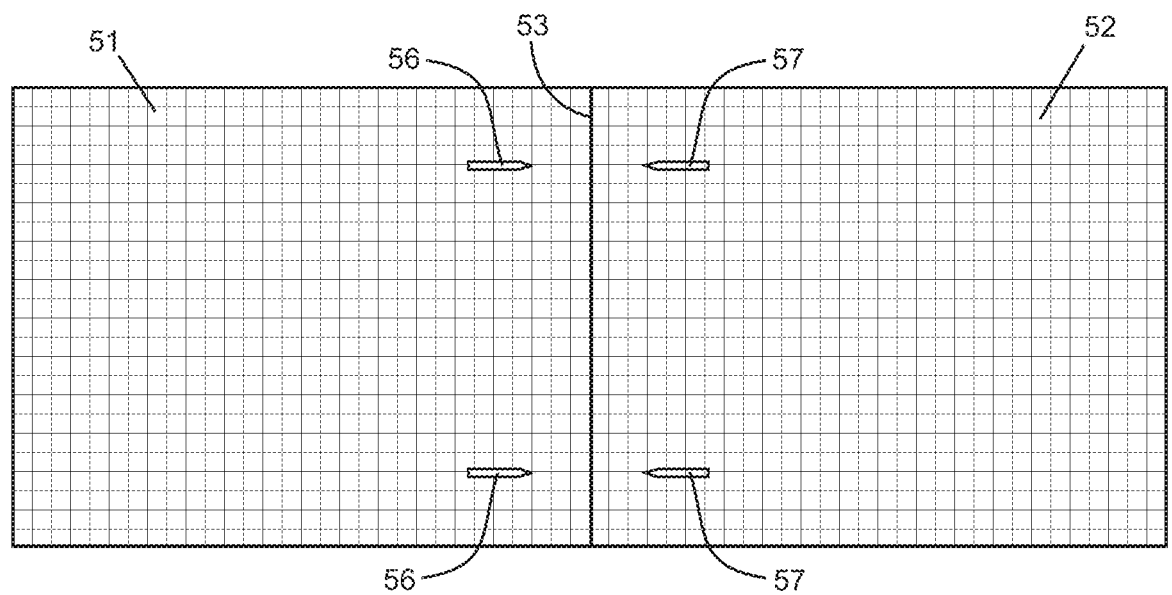
FIG. 4C depicts a top view of FIG. 4B.

While the edges of the two intumescent structures in FIG. 3A were secured together at a seam with staples, securing two flat panels of intumescent structures together at a seam may be more conveniently and securely accomplished with tack strips as shown in FIG. 4A, FIG. 4B and FIG. 4C. Such an arrangement is particular suitable for fireproofing a large flat surface such as a wall or a long girder or beam, which require connecting together a number of flat intumescent panels. As seen in FIG. 4A, FIG. 4B and FIG. 4C, a first panel 51 of intumescent structure abuts a second panel 52 of intumescent structure at a seam 53. The intumescent panels 51,52 are placed on two spaced apart tack strips 55 (only one labeled) so that a first tack 56 of one tack strip pierces through the first panel 51 from one face through the other, and a second tack 57 of the same tack strip pierces through the second panel 52 from one face through the other, as best seen in FIG. 4A. As best seen in FIG. 4C, two (or more) tack strips spaced apart across a length of the seam 53 provides for two (or more) tacks 56 to hold the first panel 51 and for two (or more) tacks 57 to hold the second panel 52. As seen in FIG. 4B and FIG. 4C, bending the tacks 56,57 to be substantially flush with the surfaces of the panels 51,52 helps prevent the panels 51,52 from separating from the tack strips 55. The tack strips 55 may be conveniently obtained as shorter segments cut from a longer tack strip, for example longer tack strips typically used for finishing edges in the upholstery industry, although other types of tack strips may be used, for example tack strips used for laying carpet.

EXAMPLES

Materials and Methods:

Steel meshes were supplied by Gerad Daniel Worldwide.

Mesh A is made of aluminum; 1.59 mm (1/16") mesh size, and 0.23 mm wire diameter; woven but not welded.

Mesh B is made of stainless steel; 3.18 mm (1/8") mesh size, and 0.43 mm wire diameter; woven but not welded.

Mesh C is made of galvanized steel; 4.23 mm (1/6") mesh size, and 0.51 mm wire diameter; woven and welded.

Mesh D is made of galvanized steel; 6.40 mm (1/4") mesh size, and 0.69 mm wire diameter; Welded but not woven.

Mesh E is made of stainless steel; 6.4 mm (1/4") mesh size, and 0.72 mm wire diameter; woven but not welded.

Metal "Punchout tack strip" is supplied by Outdoor Fraics Canada Inc.

Ammonium polyphosphate (charring catalyst): Exolit™ AP422 (Clariant).

Encapsulated ammonium polyphosphate (charring catalyst): FR Cros 487 (Budenheim).

Pentaerythritol (charring agent): Charmor™ PM40 (Perstorp Polyols Inc.).

Di-Pentaerythritol (charring agent): Charmor™ DP40 (Perstorp Polyols Inc.).

Melamine (blowing agent): Melamine Grade 003 (DSM Melamine Americas, Inc.).

Titanium dioxide ($TiO_2$) (inorganic filler): Ti-Pure™ R706 (DuPont).

Ethylene-vinyl acetate (EVA) Copolymers (binders): Levamelt™ 456 and Levamelt™ 686 from Lanxess; Elvax™ 40W from DuPont.

1) Elvax™ 40W containing 40 wt % vinyl acetate; MI of 52 g/10 min; $T_m$ of 47° C.; $T_g$ of about −34° C.; crystallinity of about 11%; and $M_w$ of about 100,000 g/mol.

2) Levamelt™ 456 containing 45 wt % vinyl acetate; MI of 15-35 g/10 min; $T_m$ of 29° C.; $T_g$ of −30° C.; crystallinity of 9%; and $M_w$ of about 20,000 g/mol. 3) Levamelt™ 686 containing 68 wt % vinyl acetate; MI of 15-35 g/10 min; $T_g$ of −18° C.; amorphous (crystallinity of 0%); and $M_w$ of about 30,000 g/mol.

Dioctyl sebacate (DOS), plasticizer: from Lanxess.

Vinnapas B30, low Mw polyvinylacetate as plasticizer; $T_g$ of 39° C.: from Wacker.

Mixing Procedure—Using Haake Mixer, a batch size of 300-420 grams of ingredients is gradually added into the Mixer that is run at 60 RPM and heated to 120-150° C. After the material is fully charged, the mixing continues for 4-5 minutes. The mixing temperature and the torque are recorded.

Intumescent Sheet Forming—The materials from the mentioned mixing procedures are pressed at 105-110° C. using a Carver hot press machine to the desired thickness.

Composite Forming—One layer of metal mesh is placed on one side of the intumescent sheet material or two layers of metal mesh are placed on both sides of the intumescent sheet material, then pressed at 105-110° C. using a Carver hot press machine.

Expansion Ratio Test—In this method, the intumescent structures are placed in a muffle furnace for 30 minutes while the furnace ramps up from 500° C. to 800° C. Char thicknesses are measured after the burn test to determine the Expansion Ratio by comparing it to the original thickness of the sample. The original sample thickness is about 2 mm.

Wet-Freeze-Heat Cycle Test—In each cycle of this method the sample is subjected simulated rain (17 h), followed by −40° C. freezing (4 h), then finally 60° C. heating (3 h).

ASTM 119 Plate Test—In this test, steel plate (300 mm×300 mm×6.4 mm) is installed with intumescent structures on one side. The plate is then placed on top of a floor furnace with the intumescent structure side facing the fire. Thermocouples are placed on the unexposed side of the plate, and then insulated with mineral blanket. The temperature of steel plate is recorded during the fire test. The time period from the start to moment the plate temperature reaches 538° C. is regarded as fire resistant time of the intumescent structure.

ASTM 119 Column Test—In this test, steel columns of 1.2 m in length are installed with pre-shaped intumescent composite structures. Thermal couples are placed at 0.6 m height of each column. The bottom end of each column is protected by concrete and the top end is protected by a mineral blanket. The temperature of the steel column is recorded during the fire test. The time period from the start to the moment the column temperature reaches 538° C. is regarded as fire resistant time.

About Materials Compounding Without Meshes

All intumescent materials described here (C1-C11) were made through mixing process at 120° C. C1-C8 use AP422 as charring catalyst and PM40 as charring agent. C9 and C11 use AP422 as charring catalyst and DP40 as charring agent. C10 uses FR Cros 487 as charring catalyst and DP40 as charring agent. Table 1 provides details of the formulations and expansion ratios.

TABLE 1

Compound formulations

| | \multicolumn{11}{c|}{Material (wt %)} |
|---|---|---|---|---|---|---|---|---|---|---|---|
| | C1 | C2 | C3 | C4 | C5 | C6 | C7 | C8 | C9 | C10 | C11 |
| Levamelt 456 | 16.9 | 22.5 | 0 | 0 | 16.1 | 16.5 | 17.5 | 18.5 | 18.5 | 18.5 | 16.0 |
| Levamelt 686 | 0 | 0 | 0 | 16.9 | 0 | 0 | 0 | 0 | 0 | 0 | 0 |
| Elvax 40W | 0 | 0 | 16.9 | 0 | 0 | 0 | 0 | 0 | 0 | 0 | 0 |
| DOS | 0 | 0 | 0 | 0 | 4.8 | 0 | 2.5 | 2.5 | 0 | 0 | 0 |
| Vinnapas B30 | 0 | 0 | 0 | 0 | 0 | 2.5 | 0 | 0 | 0 | 0 | 0 |
| AP422 | 43.1 | 40.2 | 43.1 | 43.1 | 41.0 | 42.0 | 41.4 | 41.0 | 42.2 | 0 | 40.8 |
| PR Cros 487 | 0 | 0 | 0 | 0 | 0 | 0 | 0 | 0 | 0 | 42.2 | 0 |
| DP40 | 0 | 0 | 0 | 0 | 0 | 0 | 0 | 0 | 12.1 | 12.1 | 11.7 |
| PM40 | 12.3 | 11.5 | 12.3 | 12.3 | 11.7 | 12.0 | 11.9 | 11.7 | 0 | 0 | 0 |
| Melamine | 12.3 | 11.5 | 12.3 | 12.3 | 11.7 | 12.0 | 11.9 | 11.7 | 12.1 | 12.1 | 11.7 |
| TiO2 | 15.4 | 14.4 | 15.4 | 15.4 | 14.7 | 15.0 | 14.8 | 16.1 | 15.1 | 15.1 | 14.6 |
| Zinc Stearate | 0 | 0 | 0 | 0 | 0 | 0 | 0 | 0 | 0 | 0 | 1.0 |
| Rockwool ™ | 0 | 0 | 0 | 0 | 0 | 0 | 0 | 0 | 0 | 0 | 8.5 |
| Expansion Ratio | 37 | 29 | 31 | 31 | 31 | 31 | 37 | 34 | 33 | 40 | 25 |

About Bend-Ability of Intumescent Sheet Materials Without Meshes (Examples #1-8)

TABLE 2

Intumescent materials 180° bend-ability

| | Example | | | | | | | |
|---|---|---|---|---|---|---|---|---|
| | 1 | 2 | 3 | 4 | 5 | 6 | 7 | 8 |
| Materials | C1 | C2 | C3 | C4 | C5 | C6 | C7 | C8 |
| $T_g$ (DSC) | −30° C. | −30° C. | −30° C. | −15° C. | −45° C. | −30° C. EVA, 39° C. for VA | −45° C. | −45° C. |
| $T_m$ | 29° C. | 29° C. | 47° C. | N/A | N/A | 29° C. | N/A | N/A |
| Cryst. (%) | 8% | 8% | 15% | N/A | N/A | 8% | N/A | N/A |
| Tensile strength (MPa) | 2.1 | 1.4 | 2.7 | 2.0 | 0.6 | 2.2 | 1.1 | 1.1 |
| Elongation at break (%) | 49 | 66 | 16 | 27 | 66 | 11 | 55 | 74 |
| Storage modulus G' (×10$^6$ Pa · s)$^1$ | 24 | 11 | 23 | 34 | 6.5 | 49 | 7.4 | 7.5 |
| Min. Temp. for 180° bendable | 20° C. | 0° C. | >50° C. | 10° C. | −10° C. | >70° C. | −5° C. | −10° C. |

$^1$Measured at 0.1% strain, 1 Hz by DMA.

Materials C1-C8 in Table 1 were made into sheets of about 4 mm in thickness prior to the bending test. Intumescent expansion ratios of these materials are usually between 20 to 40 times, similar to those of commercial intumescent coatings. The material is 180° bendable when the sheet can be folded 180° without noticeable cracks. The minimum temperature for 180° bendable means that any attempts to bend the intumescent material sheet below this temperature would usually fail and result in noticeable cracks, or even broken pieces. Materials with higher $T_g$ (binder), higher $T_m$ (binder), higher crystallinity (binder), higher modulus, lower binder (resin and plasticizer) content and lower elongation at break are generally more difficult to bend, and would consequently have higher "Minimum temperature for 180° bendable". For example, Ex #5 and #8 having similar $T_g$ of −45° C. and no crystallinity can be bent to a 180° angle at below −10° C., whereas un-plasticized Ex #2 can be bent at 0° C.

About Intumescing Behavior of Solid Composite Intumescent Structures (Example #9-13)

TABLE 3

Expansion behaviors of solid composite intumescent structures

| Example | Compound Formulation | Mesh | Wire thickness (mm) | Opening$^2$ | Char through mesh | Char appearance | Expansion ratio |
|---|---|---|---|---|---|---|---|
| 9 | C2 | No mesh | N/A | N/A | N/A | Slightly loose | 29 |
| 10 | C2 | A | 0.23 | 1.56 | No | N/A | Mesh distorted |
| 11 | C2 | B | 0.43 | 3.13 | Yes | Dense, uniform | 21 |
| 12 | C2 | C | 0.51 | 4.18 | Yes | Dense, uniform | 20 |
| 13 | C2 | D | 0.69 | 6.28 | Yes | Dense, uniform | 20 |

$^2$Opening = mesh size minus wire thickness.

Composite intumescent structures were made using sheet materials of C2 and metal meshes of various mesh sizes. For each single structure, identical meshes were used on front (facing fire) and back sides of the intumescent sheet. The intumescent sheet thicknesses were about 2.0 mm. All structures were mechanically fastened to the surface of a 6.4 mm thick steel plate before fire testing. When mesh opening was too small, for example in case of Mesh A, intumescent materials are not able to expand through the openings during a fire. Instead, materials will intumesce between the two meshes and distort or sometimes tear the front mesh. Composite intumescent structures with larger mesh openings (B, C, and D) allow the intumescent material to expand through the front mesh, at a reduced expansion ratio (compared to a control sample). The appearance of char is generally dense and uniform compared to the sample without mesh.

About Bend-Ability of Solid Composite Intumescent Structures (Example #14-22)

TABLE 4

Mesh type on bend-ability[3]

| Example | Materials | Mesh | 90° | 180° | Circular |
|---|---|---|---|---|---|
| 14 | C1 | C, woven and welded | MB, MC | MB, MC | NC |
| 15 | C2 | C, woven and welded | SS | SS, SC | NC |
| 16 | C5 | C, woven and welded | NS, NL | NS, NL | NC |
| 17 | C1 | B, woven but not welded | SS | SS | SS |
| 18 | C2 | B, woven but not welded | SS | SS | SS |
| 19 | C5 | B, woven but not welded | SS | SS | SS |
| 20 | C1 | D, non-woven but welded | MC, MB | MC, MB | NC |
| 21 | C2 | D, non-woven but welded | SS, SC | SS, MC | NC |
| 22 | C5 | D, non-woven but welded | NS, NL | NS, NL | NC |

[3]Bent at room temperature (20-22° C.), same mesh on both sides, materials about 4 mm in thickness.
MB: mesh broken; NS: not smooth surface, such as alligator skin; NC: not continuous radius; NL: not linear or straight bending; SS: smooth surface; SC: slight cracking of intumescent materials; MC: Intumescent materials crack.

Composite intumescent structures made of three types of intumescent materials (all 180° bend-able) and three types of meshes (all allowing char to expand through) were evaluated for bending behaviors. Intumescent material C1 is relatively rigid with highest G' and lowest elongation at break among the three materials. Intumescent material C2 has medium G' and high elongation at break. Intumescent material C5 is relatively soft with lowest G' (described in Table 2). Mesh B is woven but not welded. Mesh C is woven and welded. Mesh D is non-woven but welded.

Bending composite intumescent structures made from high modulus materials with welded meshes (woven or non-woven, Ex #14 and Ex #20) may provide non-optimal results, for example broken mesh and cracked material. Bending low modulus materials with welded mesh (woven or non-woven, Ex #16 and Ex #22) may force the intumescent material to squeeze through the mesh, generating rough surfaces such as alligator skins. It is also more difficult to use welded mesh for bending the structure into a round shape with uniform radius, especially when the diameter of the shape is small (Ex #14-16, Ex #20-22).

Bending composite intumescent structures with woven but not welded mesh (Ex #17-19) usually generates uniform and smooth shapes on the outward (convex) surface, for example the outer surface of a rectangular tube or a round pipe. Mesh breaking or materials cracking are generally not observed.

About Number of Layers of Mesh (Example #23-30)

TABLE 5

90 degree bending test using single and double layer of mesh

| Example | Materials | Mesh | Number of mesh | Location of mesh | Sheet thickness (mm) | Retained angle (°) |
|---|---|---|---|---|---|---|
| 23 | C1 | B | single | Concave | 3.5 | 123 |
| 24 | C1 | E | single | Convex | 3.5 | 111 |
| 25 | C1 | B | double | Both surfaces | 3.5 | 90 |
| 26 | C2 | B | single | Convex | 3.5 | 132 |
| 27 | C2 | E | single | Concave | 3.5 | 90 |
| 28 | C2 | E | single | Convex | 6.0 | 131 |
| 29 | C2 | B | double | Both surfaces | 6.0 | 90 |
| 30 | C7 | B | single | Convex | 3.5 | 90 |

Intumescent sheet materials C1 (high G'), C2 (medium G'), and C7 (low G') were made into flat single or double mesh composite intumescent structures using steel Mesh B (3.2 mm mesh size, 0.43 mm diameter, weaker mesh) and E (6.4 mm mesh size, 0.72 mm diameter, stronger mesh). The flat structure was then bent 90° using a bending break. When bending force was removed, the retained angle of the bended structure was measured. In general, a double mesh composite structure, for example a sandwich structure, can maintain the desired angle (shape) easier than a single mesh composite structure. It is possible, however, to bend a single mesh composite structure to the desired shape when conditions are met, for example, a stronger mesh and low G' intumescent material.

About Mesh Protects Intumescent Materials from Cracking During Bending (Example #31)

A 6 mm thick composite intumescent structure with mesh on both sides was made using intumescent material C3 and Mesh B. Intumescent material C3 is not 180° bendable as indicated in Ex. #3. C3 would be broken into pieces in such a test. The composite intumescent structure, Ex #31, can be bent 180° with only minor surface cracks.

About Surface Finish of Solid Composite Intumescent Structures (Example #32-34)

TABLE 6

Corner surface finish when using woven but non welded mesh, 90° bending from side 2 towards side 1

| Example | Compound Formulation | Side 1 Mesh (Concave) | Side 2 Mesh (Convex) | Side 1 Finish | Side 2 Finish |
|---|---|---|---|---|---|
| 32 | C2 | E | B | Slightly buckled | Relatively smooth |
| 33 | C2 | B | B | Significantly buckled | Smooth |

TABLE 6-continued

Corner surface finish when using woven but non welded mesh, 90° bending from side 2 towards side 1

| Example | Compound Formulation | Side 1 Mesh (Concave) | Side 2 Mesh (Convex) | Side 1 Finish | Side 2 Finish |
|---|---|---|---|---|---|
| 34 | C2 | B | E | Significantly buckled | Relatively smooth |

Bending composite intumescent structures with conventional equipment, e.g. a bending break, may generate buckles in the concave side. This can become an aesthetic issue if the concave side is exposed, e.g. the corner of a wide flange of steel. Such buckles can be removed or reduced by secondary mechanical processes, such as pressing the buckled surfaces to a hard surface, or by selecting a stronger mesh on the concave side as shown in Table 6.

About Hardness of Composite Intumescent Structures (Example #35)

Hardness of intumescent sheet material without metal mesh and of composite intumescent structures with metal mesh was measured. The intumescent sheet material from C2 has an average shore D hardness about 20. A composite intumescent structure using C2 and metal Mesh B has an average shore D hardness about 40.

About Weathering (Example #36-38)

TABLE 7

Intumescent materials expansion ratio after weathering test

| Example | Materials | Control | 7 cycles of wet/freeze/heat | 7 days of water immersion |
|---|---|---|---|---|
| 36 | C3 | 31 | <2 | <2 |
| 37 | C9 | 33 | 31 | 37 |
| 38 | C10 | 40 | 33 | 45 |

Intumescent materials C3, C9, and C10 were pressed into 4 mm thick sheets of 100 mm×100 mm dimension. After 7 cycles of wet-freeze-heat and 7 days of immersion tests, intumescent materials were dried at ambient temperature for a minimum of 7 days, followed by expansion ratio tests. No intumescent behavior was observed for weathered Ex #36, whereas expansion ratios from Ex #37 and Ex #38 are almost not affected after weathering tests.

About Free-Standing (Example #39)

A composite intumescent structure of 300 mm×150 mm×3 mm was made using a sheet of the intumescent material of C3 and meshes of Mesh D. The structure was bent into hollow rectangular cubic shape of 150 mm in length with a 75 mm×75 mm opening. The structure was fastened by metal wires but not attached to any substrate. The structure was then erected in a muffle furnace with the two open ends capped with mineral blankets. The temperature in the furnace was ramped from 500° C. to 800° C. for 30 min. After the test, the structure became significantly "swollen" but remained standing.

About Plate Fire Testing (Example #40-42)

TABLE 8

Plate test under ASTM 119

| Example | Materials | Mesh | Attaching method | Fire resistant time (min) |
|---|---|---|---|---|
| 40 | C3 | None | Epoxy resins | 73 |
| 41 | C3 | D, single | Bolts | 102 |
| 42 | C3 | D, both sides | Bolts | 112 |

Two composite intumescent structures of 300 mm×300 mm×2 mm were tested according to ASTM 119 standard and compared with a mesh free intumescent sheet material. The composite intumescent structures were fastened to the steel plate by bolts at four corners. The mesh free intumescent sheet material was glued to the steel plate by epoxy resin. The composite intumescent structures provide significantly longer fire resistance time as seen in Table 8 and FIG. 2.

About Column Fire Testing (Example #43-46)

TABLE 9

Column test under ASTM 119

| Example | Column (metric) | M/D (kg/m²) | Protection style | Mesh | Seam | Fire resistant time (min) | 3M intumescent coating resistant time (min) |
|---|---|---|---|---|---|---|---|
| 43 | 102 × 102 × 13 | 87.7 | Contour/Box | B | ¼", 3M FB136 caulking | 105 | 99 |
| 44 | 127 × 76 × 6.4 | 44.8 | Contour/Box | B | ³⁄₁₆", IC-15WB caulking | 75 | 66 |
| 45 | W100 × 19 | 32.2 | Contour | E | ³⁄₁₆", 3M intumescent coating WB1000 | 90 | 91 |

TABLE 9-continued

Column test under ASTM 119

| Example | Column (metric) | M/D (kg/m$^2$) | Protection style | Mesh | Seam | Fire resistant time (min) | 3M intumescent coating resistant time (min) |
|---|---|---|---|---|---|---|---|
| 46 | W100 × 19 | 32.2 | Box | B | 1/16", 3M intumescent coating WB1000 | 81 | N/A |

Composite intumescent structures of 600 mm×300 mm×4 mm are prepared using materials from C2 and mesh B or E. In Ex #43 and #44 the structures are bent to form half of a square or rectangular shape of 600 mm in length, so that two of such pre-shaped structures can form an enclosure for a column 600 mm in height, and four of such pre-shaped structures can form an enclosure for a 1200 mm high column. In Ex #45, the 600 mm long structure is pre-shaped into structure 11 as shown in FIG. 3C. Four of such 600 mm long structures 11 are used to enclose a wide flange steel W100×19 of 1200 mm height. In Ex #46, a 600 mm long half rectangular structure is pre-shaped similar to Ex #40. Four of such structures are used to box a 1200 mm long W100×19 with the vertical seams at the flange side. Tack strips shown in FIG. 4 are used to fasten the shaped composite intumescent structures onto the steel columns. Seams at the joints of each example are filled with 3M fire protection products such as FB 136, a fire barrier sealant; IC-15WB, an intumescent caulking; and WB1000, an intumescent coating. The column test results are compared to a commercial 3M intumescent coating with 3.7 mm thickness.

About Bending at Low Resin (High Filling) Level and High Thickness for 180 Degree Angle (Example #47)

Ex #47 is a composite sheet made from C11 and a double layer of mesh B at a total thickness of 6.0 mm. The composite sheet is bent with a bending break and fold to an angle of 180 degrees at room temperature. The bent composite sheet maintains the folded shaped when bending force is removed, and only minor cracks are observed at the edges.

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A free-standing solid composite intumescent structure comprising at least one bendable, rigid metal mesh secured on or in a bendable intumescent sheet material, the structure bendable by a bending force into a shape at a temperature above −10° C. while retaining the bended shape when the bending force is removed, the intumescent sheet material comprising:
   10 wt % or more, based on total weight of the sheet material, of a polymeric resin;
   inorganic filler; and,
   an intumescent component comprising a charring agent, a catalyst, and a blowing agent;
   wherein the free-standing solid composite intumescent structure is capable of acting as a fireproofing material and the at least one metal mesh has a capacity to retain the bended shape without significant deformation, the capacity being greater than a memory force of the intumescent sheet material to return to original shape.

2. The structure according to claim 1, wherein the at least one bendable metal mesh comprises at least two bendable metal meshes and the sheet material is disposed between two of the at least two bendable metal meshes.

3. The structure according to claim 1, wherein the at least one bendable metal mesh comprises two bendable metal meshes and the sheet material is disposed between the two bendable metal meshes.

4. The structure according to claim 1, wherein the temperature at which the structure is bendable while retaining the bended shape is in a range of −10° C. to 150° C.

5. The structure according to claim 1, wherein at least one of the at least one bendable metal mesh has a mesh size of 1.5 mm or greater.

6. The structure according to claim 1, wherein the at least one mesh is not welded.

7. The structure according to claim 5, wherein the at least one mesh is woven but not welded.

8. The structure according to claim 1, wherein the at least one metal mesh is embedded in the intumescent sheet material to fully occlude mesh openings where the at least one mesh is in contact with the sheet material.

9. The structure according to claim 1, wherein the at least one metal mesh is secured to at least one surface of the intumescent sheet material.

10. The structure according to claim 1, wherein the at least one metal mesh comprises at least two metal meshes and the metal meshes are the same.

11. The structure according to claim 1, wherein the sheet material has a thickness of up to about 25 mm.

12. The structure according to claim 1, wherein the sheet material comprises 15 wt % or more of the resin.

13. The structure according to claim 1, wherein:
   the resin has a crystallinity index of 20% or less;
   the resin has a glass transition temperature at least 25° C. lower than the temperature of bending;
   the resin has a melting temperature lower than the temperature of bending unless the crystallinity index of the resin is lower than 10%;
   the intumescent material has a storage modulus in a range of $10^6$-$10^9$ Pa at the temperature of bending;
   the intumescent material has an elongation at break of 15% or more at the temperature of bending; or,
   any combination thereof.

14. The structure according to claim 9, wherein the resin is amorphous.

15. The structure according to claim 9, wherein the resin is semi- crystalline and has a crystallinity index of 10% or less.

16. The structure according to claim 1, wherein the intumescent component is phosphate-based.

17. The structure according to claim 1, wherein the resin comprises an ethylene-vinyl acetate copolymer.

18. The structure according to claim 17, wherein the ethylene-vinyl acetate copolymer has a vinyl acetate content of 40 wt % or more based on total weight of the copolymer.

19. The structure according to claim 17, wherein the ethylene-vinyl acetate copolymer has a vinyl acetate content in a range of 41-90 wt % based on total weight of the copolymer.

20. The structure according to claim 17, wherein the ethylene-vinyl acetate copolymer has a vinyl acetate content in a range of 42-70 wt % based on total weight of the copolymer.

21. The structure according to claim 1, wherein the intumescent sheet material has an expansion ratio in a range of 10-60.

22. The structure according to claim 1, further comprising either a decorative or protective coating.

* * * * *

UNITED STATES PATENT AND TRADEMARK OFFICE
CERTIFICATE OF CORRECTION

PATENT NO. : 10,683,457 B2
APPLICATION NO. : 15/033917
DATED : June 16, 2020
INVENTOR(S) : Jiangdong Tong Page 1 of 1

It is certified that error appears in the above-identified patent and that said Letters Patent is hereby corrected as shown below:

In the Specification

Column 1
Line 8, Delete "Oct," and insert -- Oct. --, therefor.

Column 2
Line 30, Delete "handling" and insert -- handling. --, therefor.
Line 34, Delete "1.0-1 2 mm" and insert -- 1.0-1.2 mm --, therefor.

Column 9
Line 47, Delete "(e g" and insert -- (e.g. --, therefor.

In the Claims

Column 24
Line 66, In Claim 15, delete "semi- crystalline" and insert -- semi-crystalline --, therefor.

Signed and Sealed this
Eighteenth Day of August, 2020

Andrei Iancu
*Director of the United States Patent and Trademark Office*